United States Patent
Kim et al.

(10) Patent No.: US 9,706,582 B2
(45) Date of Patent: Jul. 11, 2017

(54) SMART LOCAL DEVICE REDISCOVERY

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 299 days.

(21) Appl. No.: 14/242,806

(22) Filed: Apr. 1, 2014

(65) Prior Publication Data

US 2015/0282217 A1    Oct. 1, 2015

(51) Int. Cl.
| | |
|---|---|
| G06F 15/16 | (2006.01) |
| H04W 76/02 | (2009.01) |
| H04L 29/08 | (2006.01) |
| H04L 12/18 | (2006.01) |
| H04W 88/08 | (2009.01) |

(52) U.S. Cl.
CPC ........... *H04W 76/02* (2013.01); *H04L 12/189* (2013.01); *H04L 67/2842* (2013.01); *H04W 88/08* (2013.01)

(58) Field of Classification Search
CPC ................................................ H04L 29/12811
See application file for complete search history.

(56) References Cited

U.S. PATENT DOCUMENTS

| | | | | |
|---|---|---|---|---|
| 2003/0036350 | A1* | 2/2003 | Jonsson | H04W 48/20 455/41.1 |
| 2004/0267837 | A1* | 12/2004 | Wang | G06F 8/65 |
| 2005/0280862 | A1* | 12/2005 | Fukushima | H04L 12/2803 358/1.15 |
| 2007/0025384 | A1* | 2/2007 | Ayyagari | H04B 3/542 370/445 |
| 2007/0127670 | A1* | 6/2007 | Morishima | H04L 12/1818 379/202.01 |
| 2010/0309915 | A1* | 12/2010 | Pirbhai | H04L 29/12028 370/392 |
| 2010/0317332 | A1* | 12/2010 | Bathiche | H04L 12/282 455/418 |
| 2014/0244715 | A1* | 8/2014 | Hodges | H04L 67/42 709/203 |

* cited by examiner

*Primary Examiner* — Ario Etienne
*Assistant Examiner* — SM Z Islam
(74) *Attorney, Agent, or Firm* — Kilpatrick Townsend & Stockton LLP

(57) ABSTRACT

A smart local device rediscovery method is disclosed to take advantage of network devices with persistent addresses. A network device can quickly display cached status information from known network devices to a user while transmitting status update and network discovery requests to determine the accuracy of the cached information. The network device can use cached last known addresses to send unicast status update requests to known devices while concurrently performing a multicast discovery request to check for new devices or devices with changed addresses. A user can be provided with cached information immediately and the display can be updated as replies to the status update requests and discovery requests are received.

27 Claims, 9 Drawing Sheets

SMART LOCAL DEVICE REDISCOVERY

TECHNICAL FIELD

The present disclosure relates to computer networking generally and more specifically to device discovery on a network.

SUMMARY

The present disclosure relates to smart local rediscovery of known network devices involving transmitting a unicast status update request addressed to the last known address of a network device while also transmitting a multicast discovery request to the network. A device using smart local rediscovery can quickly access any persistent, known network devices without having to wait for responses from a multicast discovery request.

In an embodiment, when a mobile device connects to a local network, it can access a cache of the mobile device to find last known addresses and last known statuses of known devices. The mobile device can quickly present a display listing the last known devices and the corresponding last known statuses without first waiting to obtain current status information. The mobile device can concurrently transmit unicast status update requests addressed to the last known addresses and transmit a multicast discovery request to the network.

For each known network device that still has the same address as the last known address, the mobile device will very quickly receive a reply to the status update request that gives the mobile device updated status information about the network device (e.g., whether a switch in the network device is open or closed).

For each known network device that has a different address than the last known address, the mobile device will receive a reply to the multicast discovery request with the new address of the network device. The mobile device can then update its cache and transmit a status update request addressed to that new address. The mobile device can then receive a reply to the status update request that gives the mobile device updated status information about the network device.

For each known network device that is no longer present on the local network, the mobile device can wait a predetermined amount of time and then remove the no-longer present network device from the cache and the display.

For each new network device discovered, the mobile device can add the network device to the cache and transmit a status update request addressed to the address of the new network device. The mobile device can then receive a reply to the status update request that gives the mobile device updated status information about the network device. The mobile device can display the new device along with its status information.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The specification makes reference to the following appended figures, in which use of like reference numerals in different figures is intended to illustrate like or analogous components

DETAILED DESCRIPTION

Figure 1:
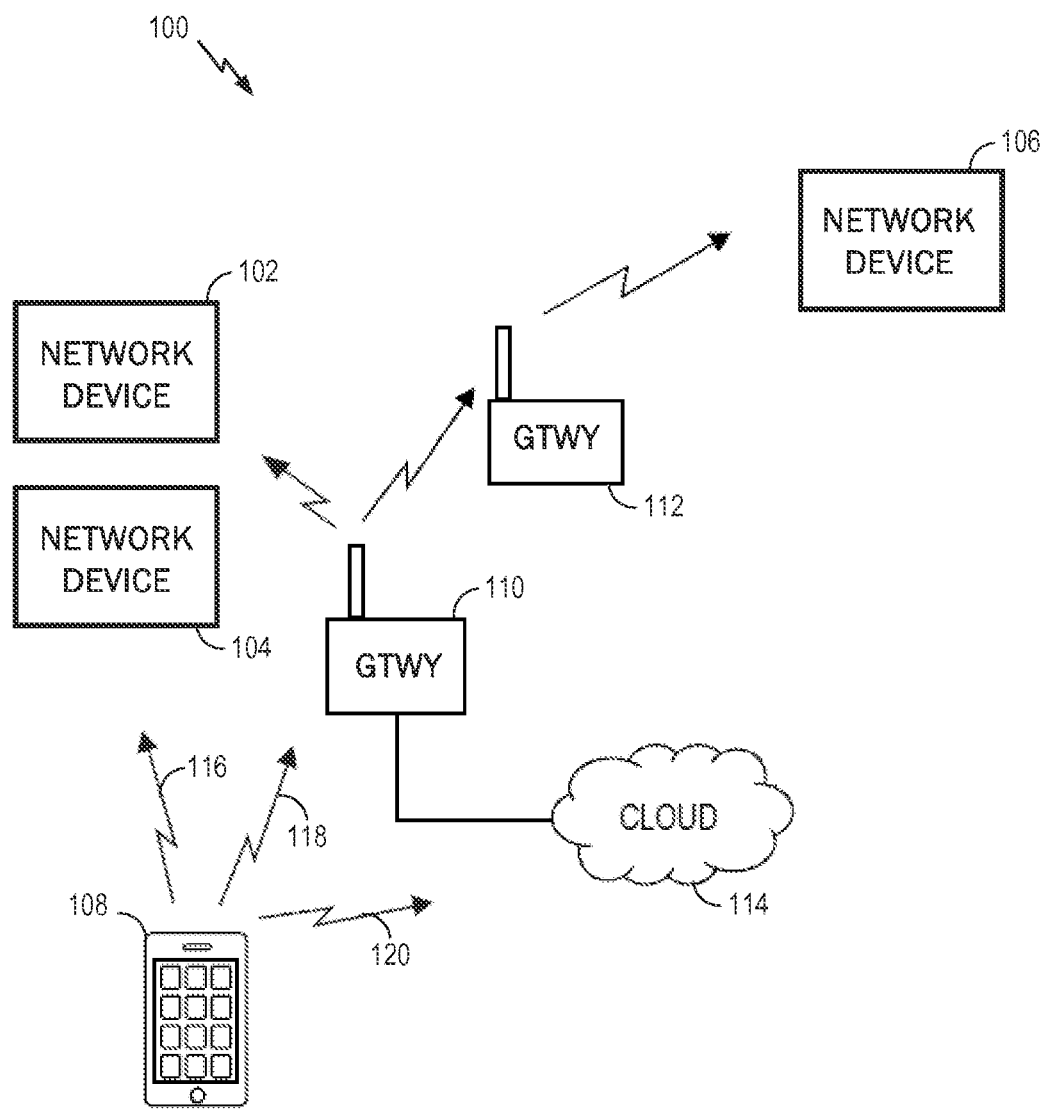
FIG. 1 is a schematic illustration of a wireless local area network according to one embodiment.

The present disclosure relates to smart local rediscovery of known network devices involving transmitting a unicast status update request addressed to the last known address of a network device while also transmitting a multicast discovery request to the network. A device using smart local rediscovery can quickly access any persistent, known network devices without having to wait for responses from a multicast discovery request.

A local area network, such as a user's home local area network, can include multiple network devices that provide various functionalities. For example, a home automation network device may provide a user with the ability to remotely configure or control one or more appliances within the user's home. Network devices may be accessed by other network devices. When a network device accesses the network, the network device may wish to know the presence and network addresses, such as the IP addresses, of other network devices accessible on the local area network. This process of determining network addresses of network devices on the local area network can be known as network discovery.

Delays, such as those incurred while waiting for a discovery process to complete, can be undesirable. Such delays can be especially undesirable when presenting a display, such as a status display. It can be desirable to present a status display as soon as possible. It can be desirable to enable communication with a persistent, known network device as soon as possible. It can be desirable for a user to be able to access the network devices (e.g., using a mobile device) while located within the local area network and also while located remotely from the local area network. As explained herein, a local area network may include multiple logical networks. In some embodiments, a user may create an account with login information that is used to authenticate the user and allow access to the network devices. For example, once an account is created, a user may enter the login information in order to access a network device in a logical network.

The local area network may include one or more gateways that provide the user with access to the network devices. The one or more gateways may also provide the user and the network devices with access to one or more external networks, such as a cloud network, the Internet, and/or other wide area networks.

In some embodiments, an accountless authentication process may be performed so that the user can access one or more network devices within a logical network without having to enter network device login credentials each time access is requested. While located locally within the local area network, the mobile device may be authenticated based on the mobile device's authentication with the logical network. For example, if the mobile device has authorized access to the logical network (e.g., a WiFi network provided by a gateway), the network devices paired with that logical network may allow the mobile device to connect to them without requiring a login. Accordingly, only users of mobile devices that have authorization to access the logical network are authorized to access network devices within the logical network, and these users are authorized without having to provide login credentials for the network devices.

While remote, the user may access the network devices using an external network, such as a cloud network and/or the Internet. An accountless authentication process may also be performed when the user is remote so that the user can access network devices within the logical network without having to enter network device login credentials. For example, a cloud network server may provide a network ID and/or one or more keys to a network device and to a mobile device (e.g., running an application, program, or the like). In some cases, a unique key may be generated for the network device and a separate unique key may be generated for the mobile device. The keys may be specifically encrypted with unique information identifiable only to the network device and the mobile device. The network device and the mobile device may be authenticated using the network ID and/or each device's corresponding key each time the network device or mobile device attempts to access the cloud network server.

In an embodiment, when a mobile device connects to a local network, it can access a cache of the mobile device to find last known addresses and last known statuses of known devices. The mobile device can quickly present a display listing the last known devices and the corresponding last known statuses without first waiting to obtain current status information. The mobile device can concurrently transmit unicast status update requests addressed to the last known addresses and transmit a multicast discovery request to the network.

For each known network device that still has the same address as the last known address, the mobile device will very quickly receive a reply to the status update request that gives the mobile device updated status information about the network device (e.g., whether a switch in the network device is open or closed).

For each known network device that has a different address than the last known address, the mobile device will receive a reply to the multicast discovery request with the new address of the network device. The mobile device can then update its cache and transmit a Device B status update request addressed to that new address. The mobile device can then receive a reply to the Device B status update request that gives the mobile device updated status information about the network device.

For each known network device that is no longer present on the local network, the mobile device can wait a predetermined amount of time and then remove the no-longer present network device from the cache and the display.

For each new network device discovered, the mobile device can add the network device to the cache and transmit a status update request addressed to the address of the new network device. The mobile device can then receive a reply to the status update request that gives the mobile device updated status information about the network device. The mobile device can display the new device along with its status information.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 is a schematic illustration of a wireless local area network 100 according to one embodiment. The local area network 100 includes network device 102, network device 104, and network device 106. In some embodiments, the network devices 102, 104, 106 may include home automation network devices that allow a user to access, control, and/or configure various home appliances located within the user's home, such as a television, radio, light, microwave, iron, and/or the like. For example, network device 102 may include a home automation switch that may be coupled with a home appliance.

A user may wirelessly communicate with the network devices 102, 104, 106 using mobile device 108. The mobile device 108 may include a cellular telephone, a smartphone, a laptop computer, a tablet, a personal digital assistant (PDA), a computing device, wearable devices (e.g., a smart watch, or the like), or any other mobile device having wireless connection capability. While only a single mobile device 108 is shown in FIG. 1, one of ordinary skill in the art will appreciate that multiple mobile devices may connect with the network devices 102, 104, 106. The user may interact with the network devices 102, 104, or 106 using an application, a web browser, a proprietary program, or any other program executed and operated by the mobile device 108. In some embodiments, the mobile device 108 may communicate directly with the network devices 102, 104, 106 (e.g., communication signal 116). In some embodiments, the mobile device 108 may communicate with the network devices 102, 104, 106 via the gateways 110, 112 (e.g., communication signal 118) and/or the cloud network 114 (e.g., communication signal 120).

The local area network 100 further includes gateway 110 and gateway 112. Gateway 110 or 112 can be utilized for communicating with network devices 102, 104, 106 or mobile device 108 via radio signals in order to provide communication, location, and/or other services to the devices. While two gateways 110 and 112 are shown in FIG. 1, one of ordinary skill in the art will appreciate that any number of gateways may be present within the local area network 100. The wireless network provided by gateway 110 and gateway 112 may be any type of network familiar to those skilled in the art that can support data communications using any of a variety of commercially-available protocols. For example, gateways 110, 112 may provide wireless communication capabilities for the wireless local area network 100 using particular communications protocols, such as WiFi (e.g., IEEE 802.11 family standards, or other mobile communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides wireless network access among one or more computing devices and/or external networks. For example, gateway 110 may include a router and gateway 112 may include a range extender.

The gateways 110 and 112 may also provide the mobile device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application. In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106, and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the mobile device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

The local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
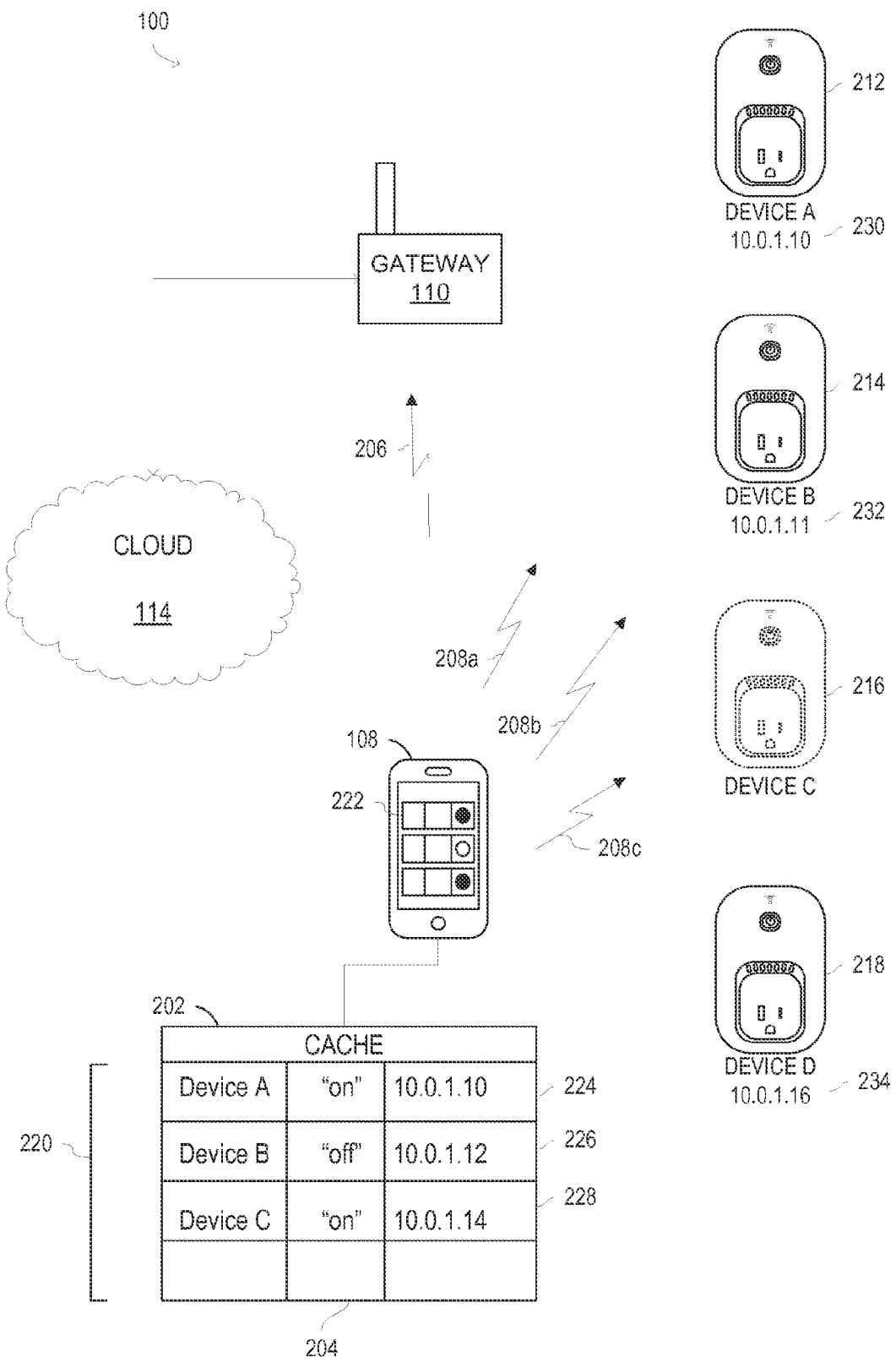
FIG. 2 is a schematic illustration of a local area network during a discovery initiation step according to one embodiment.

FIG. 2 is a schematic illustration of a local area network 100 during a discovery initiation step according to one embodiment. The local area network 100 can include a gateway 110. The local area network 100 can include a Device A 212, a Device B 214, and a Device D 218. The local area network 100 may have included a Device C 216 that is no longer present in the local area network 100. Device A 212 can have a Device A current address 230. Device B 214 can have a Device B current address 232.

Device C 216, being no longer accessible on the local area network 100, has no current address. Device D 218 can have a Device D current address 234. Device A 212, Device B 214, Device C 216, and Device D 218 can be network devices, such as home automation switches, that can have a status, such as "on" or "off." The embodiments described herein can be used with various types of network devices and varying numbers networked devices. A status of a network device may be any piece of information pertinent to that particular network device. The status of a network device may be any changeable variable of that particular network device.

In the following examples, Device A 212 is a network device that has been previously discovered (e.g., by the mobile device 108 or a device capable of updating the cache 202 of the mobile device 108), and has not since changed addresses. Device B 214 is a network device that has been previously discovered but has since changed addresses. In some embodiments, the IP address lease to Device B 214 can have expired and Device B 214 could have been given an IP address that was different than a previous IP address. In some embodiments, Device B 214 can have been manually set to a different IP address, whether by changing settings on a DHCP server, on Device B 214 itself, or otherwise. Device C 216 is a network device that has been previously discovered but has since left the local area network 100 and is no longer accessible. Device D 218 is a network device that has not been previously discovered by the mobile device 108 or a device that has updated the cache 202 of the mobile device 108.

In an embodiment, a program may be run on the mobile device 108. The program may cause the mobile device 108 to present a status display 222 of the status of each network device accessible on the local area network 100. When the application is run on the mobile device 108, the mobile device 108 can access a cache 202. In some embodiments, the mobile device 108 can first determine whether the mobile device 108 is on the local area network 100 or another network. In some embodiments, the mobile device 108 may only perform smart local network rediscovery when the mobile device 108 is on the local area network 100.

The cache 202 can be a local cache located in onboard storage of the mobile device 108. The cache 202 can contain a known device list 220 with a Device A last known address 224, a Device B last known address 226, and a Device C last known address 228. The known device list 220 can list each device known by the mobile device 108 to exist on the local area network 100. Device A 212, Device B 214, and Device C 216 can be present on the known device list 220 because the mobile device 108 or another device capable of updating the cache 202 of the mobile device 108 has previously discovered Device A 212, Device B 214, and Device C 216. The cache 202 contains no information about Device D 218 because either the mobile device 108 has not previously discovered Device D 218 or another device capable of updating the cache 202 of the mobile device 108 has not updated the cache 202 with information about Device D 218. For example, Device D 218 can have just recently been added to the local area network 100, prior to turning on the mobile device 108.

In addition to address information, the cache 202 can contain known status information 204 about each device in the known device list 220. When the application is run on the mobile device 108, the mobile device 108 can access the known status information 204 in the cache 202 to present a status display 222. In an example, the status display 222 can include a tile for each device in the known device list 220. The mobile device 108 can populate each tile with an indicator representing the respective known status information 204 for each device in the known device list 220. For example, a status display 222 can include an indicator representing an "on" state for Device A 212 and Device C 216, and an indicator representing "off" for Device B 214.

In some embodiments, the cache 202 can include information about the network device firmware version, last known firmware update status, connectivity to cloud status, registration status (e.g., whether the device has a key or not), and other such information. The cache 202 can include information that could be used for troubleshooting. In embodiments where the mobile device 108 is accessing a cache 510 of another network device, the mobile device 108 can use any information in the cache 510 to update its own cache 202, update a display on the mobile device 108, or pass information to the cloud network 114, such as for troubleshooting.

The mobile device 108 can use each last known address 224, 226, 228 in the known device list 220 to transmit a status update request 208a, 208b, 208c to each device in the known device list 220. The mobile device 108 can transmit a Device A status update request 208a to the Device A last known address 224. The mobile device 108 can transmit a Device B status update request 208b to the Device B last known address 226. The mobile device 108 can transmit a Device C status update request 208c to the Device C last known address 228. Each status update request 208a, 208b, 208c, can elicit a reply from the corresponding network device. Each status update request 208a, 208b, 208c can be sent as a unicast transmission directed to a particular address. Each status update request 208a, 208b, 208c can be routed through various network devices, such as a gateway 110. As used herein, all transmissions, requests, and replies can include one or multiple packets of information. Unicast transmissions can be sent via UDP, TCP, HTTP, HTTPS, or other suitable protocols.

The mobile device 108 can also transmit a discovery request 206 to the entire local area network 100. The discovery request 206 can be a UDP transmission. The discovery request 206 can be a UPnP network discovery request. The discovery request 206 can be a multicast transmission or a broadcast transmission. In some embodiments, the discovery request 206 can be a group of transmissions sent individually to a group of IP address on an IP subnet, where the group of IP addresses is not based on any last known IP addresses of a previously discovered device. The mobile device 108 can transmit the discovery request 206 and the status update requests 208a, 208b, 208c in any order. The mobile device 108 can transmit the discovery request 206 concurrently with the status update requests 208a, 208b, 208c, which can include being transmitted at approximately the same time or being transmitted at times very close together. The mobile device 108 can transmit the discovery request 206 immediately after or immediately before one of the status update requests 208a, 208b, 208c. The mobile device 108 can transmit the status update requests 208a, 208b, 208c while waiting for a reply from the discovery request 206.

Figure 3:
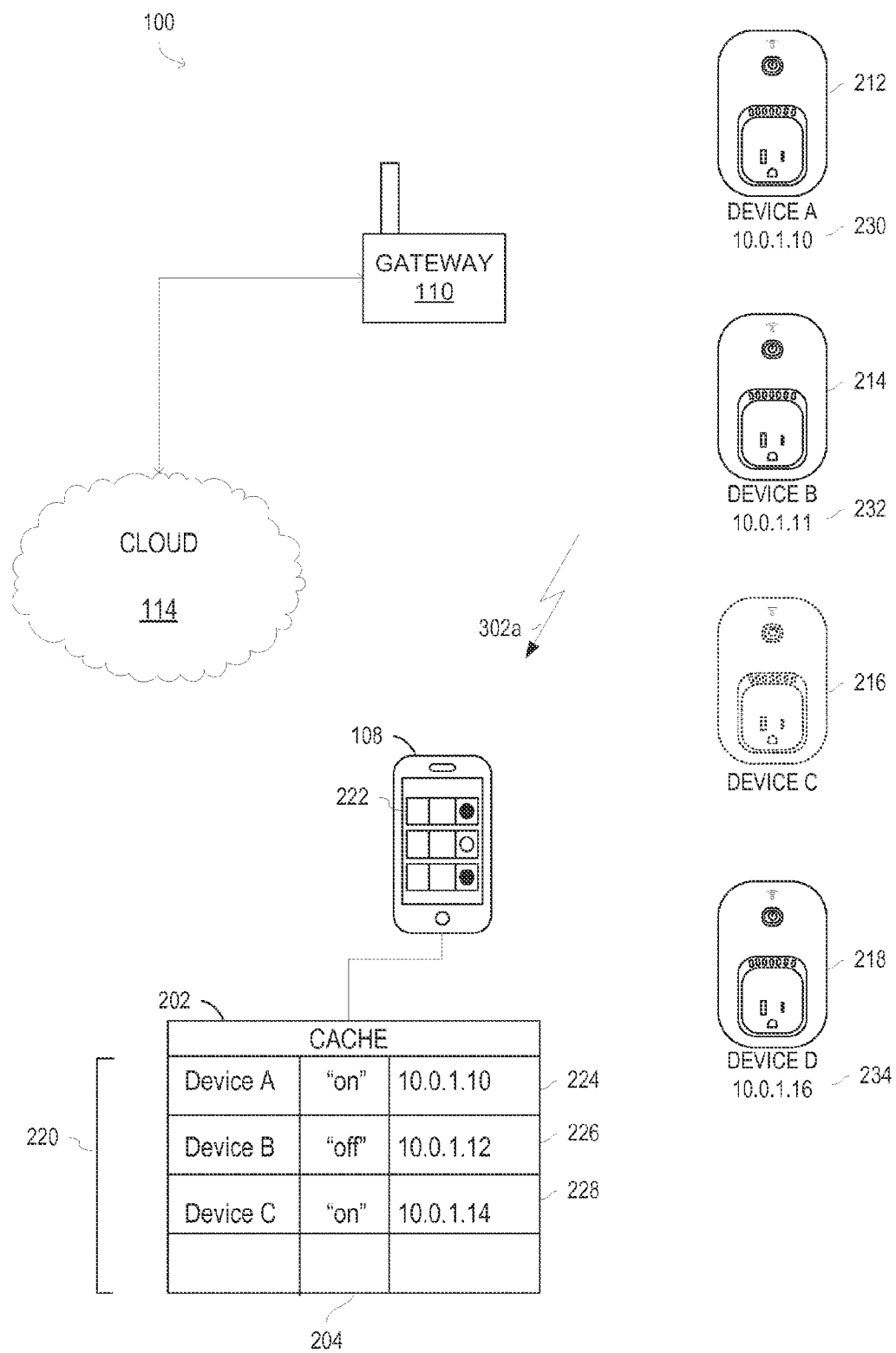
FIG. 3 is a schematic illustration of a local area network during a persistent device reply step according to one embodiment.

FIG. 3 is a schematic illustration of a local area network 100 during a persistent device reply step according to one embodiment. The persistent device reply step can occur following the discovery initiation step. In the persistent device reply step, all previously known devices that are still accessible on the network at their respective last known addresses, as stored in cache 202, can transmit replies to the mobile device 108.

Referring to FIGS. 2 and 3, because the Device A current address 230 is identical to the Device A last known address 224, the Device A status update request 208a sent to the Device A last known address 224 will be received by Device A 212. After receiving the Device A status update request 208a, Device A 212 can reply with a status update reply 302a directed to the mobile device 108. The status update reply 302a can be a unicast transmission containing information about the current status of the Device A 212. For example, if Device A 212 is a home automation switch, the status update reply 302a can contain information about the "on" or "off" state of the switch. Upon receiving the status update reply 302a, the mobile device 108 can update the known status information 204 of the cache 202 based on the current status information in the status update reply 302a. The mobile device 108 can update the status display 222 based on either the updated known status information 204 of the cache or the current status information in the status update reply 302a.

Because the Device B current address 232 is different from the Device B last known address 226, the Device B status update request 208b addressed to the Device B last known address 226 will not be received by Device B 214. Therefore, Device B 214 will not initiate any reply.

Because Device C 216 is no longer connected to the local area network 100 and is no longer accessible on the local area network 100, the Device C status update request 208c cannot reach Device C 216, and Device C 216 cannot initiate any reply.

Because the cache 202 contains no information about Device D 218, the mobile device 108 did not transmit any status update request to any last known address of Device D 218. Therefore, Device D 218, will not initiate any reply.

Figure 4:
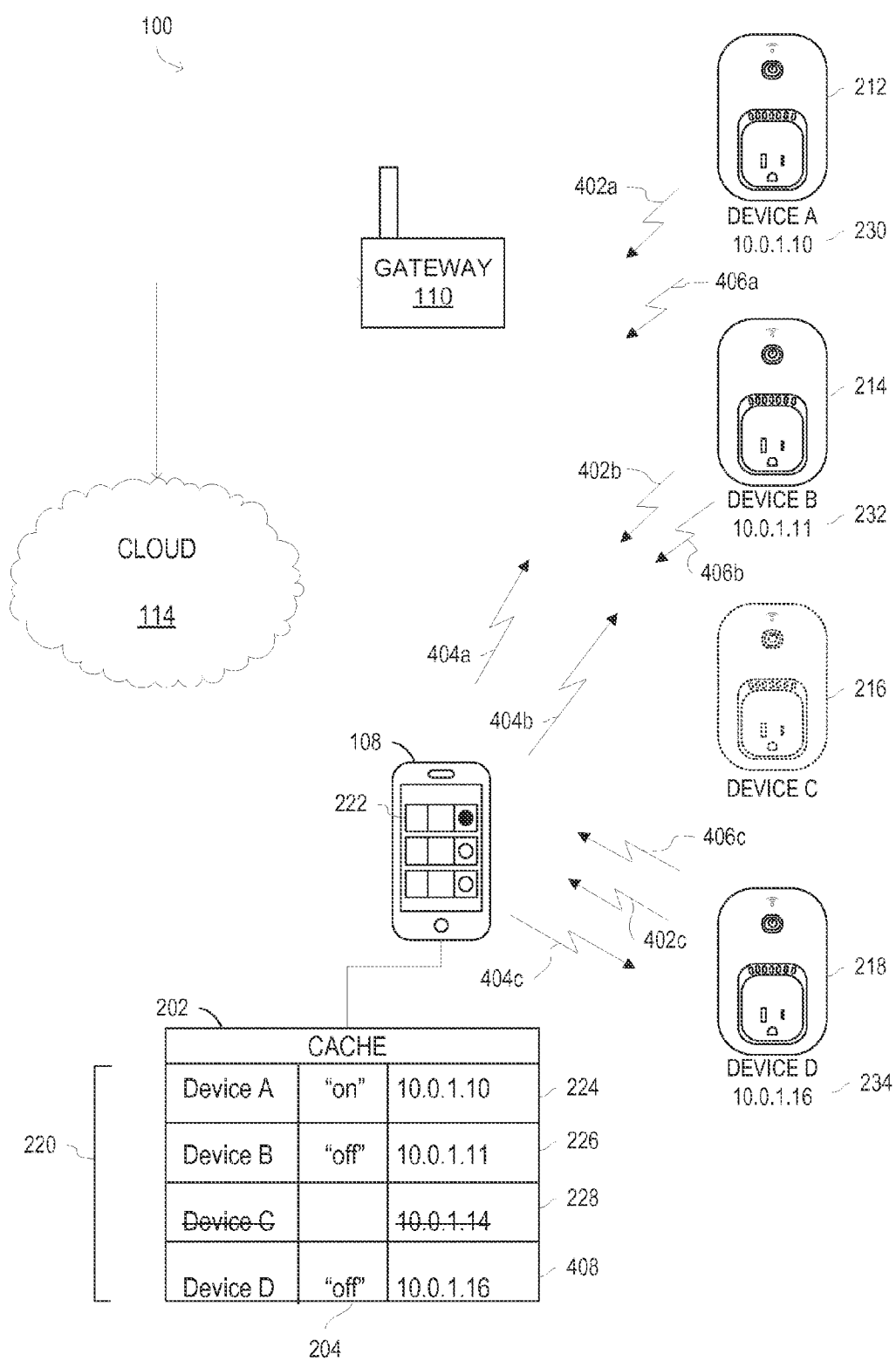
FIG. 4 is a schematic illustration of a local area network during a discovery reply step according to one embodiment.

FIG. 4 is a schematic illustration of a local area network 100 during a discovery reply step according to one embodiment. The discovery reply step can occur after the discovery initiation step. The discovery reply step can occur before or after the persistent device reply step, but may often occur after the persistent device reply step. In the discovery reply step, all devices on the local area network 100 that can receive the discovery request 206 can produce a discovery reply 402a, 402b, 402c.

Referring to FIGS. 2-4, upon receiving the discovery request 206, Device A 212 can produce a Device A discovery reply 402a directed to the address of the mobile device 108. The Device A discovery reply 402a can include the Device A current address 230. Upon receiving the discovery request 206, Device B 214 can produce a Device B discovery reply 402b directed to the address of the mobile device 108. The Device B discovery reply 402b can include the Device B current address 232. Because Device C 216 is no longer accessible on the network, Device C 216 does not receive the discovery request 206 and cannot initiate a reply. Upon receiving the discovery request 206, Device D 218 can produce a Device D discovery reply 402c directed to the address of the mobile device 108. The Device D discovery reply 402c can include the Device D current address 234.

After receiving one or more discovery replies 402a, 402b, 402c, the mobile device 108 can update the cache with the received information, including which devices 212, 214, 218 are accessible on the network and the respective current addresses 230, 232, 234 of the devices.

After receiving the Device A discovery reply 402a, the mobile device 108 can determine that the Device A current address 230 is identical to the Device A last known address 224 and take no further action. In alternate embodiments, the mobile device 108 can update the cache 202. The mobile device 108 can update the cache 202 with the time the mobile device 108 received the Device A discovery reply 402a. If a Device A status update reply 302a has been recently received, the mobile device 108 can determine that it is unnecessary to transmit a second Device A status update request 404a, at least because the mobile device 108 already has current information about the status of Device A 212. In alternate embodiments, the mobile device 108 can transmit a second Device A status update request 404a to the Device A current address 230 in order to obtain the most up to date information about the status of Device A 212. Upon receipt of the second Device A status update request 404a, Device A 212 can transmit a second Device A status reply 406a including information about the status of Device A 212. The mobile device 108 can use the information obtained from the second Device A status update request 404a to update the cache 202 and the status display 222 as described above.

After receiving the Device B discovery reply 402b, the mobile device 108 can determine that the Device B current address 230 is different from the Device B last known address 226. The mobile device 108 can determine that the Device B discovery reply 402b originated from Device B 214 at least by matching identifying information from the Device B discovery reply 402b with information stored in the cache 202. For example, such identifying information can be a mac address, a serial number, or other identifying information. The mobile device 108 can update the cache 202 with the Device B current address 232. The mobile device 108 can then transmit a second Device B status update request 404b to elicit a Device B status update reply 406b, which can be used to update the cache 202 and the status display 222 as described above.

After waiting for a predetermined amount of time, if no discovery reply is received by the mobile device 108 from Device C 216, the mobile device 108 will assume that Device C 216 is no longer accessible on the local area network 100. The mobile device 108 can update the cache 202 accordingly, for example by erasing entries pertaining to Device C 216, removing the Device C last known address 228, or by making an indication in the cache 202 that Device C 216 is no longer connected to the local area network 100. Additionally, the mobile device 108 can cease displaying Device C 216 on the status display 222. In alternate embodiments, the mobile device 108 can continue to display Device C 216 on the status display 222, but with an indication that Device C 216 is no longer accessible on the network, such as a display indicating a "Not Detected" status.

After receiving the Device D discovery reply 402c, the mobile device 108 can determine that Device D 218 does not exist in the known device list 220 and can update the cache accordingly with information about Device D 218, such as identifying information and the Device D current address 234. The mobile device 108 can then transmit a Device D status update request 404c to elicit a Device D status update reply 406c, which can be used to update the cache 202 and the status display 222 as described above.

In some embodiments, information about the status of the device 212, 214, 218 is included in the discovery replies 402a, 402b, 402c and there is no need for status update requests 404a, 404b, 404c and status update replies 406a, 406b, 406c.

In some embodiments, if a Device A discovery reply 402a is received before a Device A status update reply 302a, the mobile device 108 can cancel any outstanding status Device A update request 208a, such as if the Device A discovery reply 402a included status information about Device A 212. In some embodiments, if a Device B discovery reply 402b is received before a status update reply expected form Device B 214, the mobile device 108 can cancel any outstanding Device B status update request 208b, such as if the mobile device 108 knows that the Device B last known address 226 is incorrect based on the information contained in the Device B discovery reply 402b.

In some embodiments, the mobile device 108 can cancel any pending discovery requests 206 that have not yet timed out.

Figure 5:
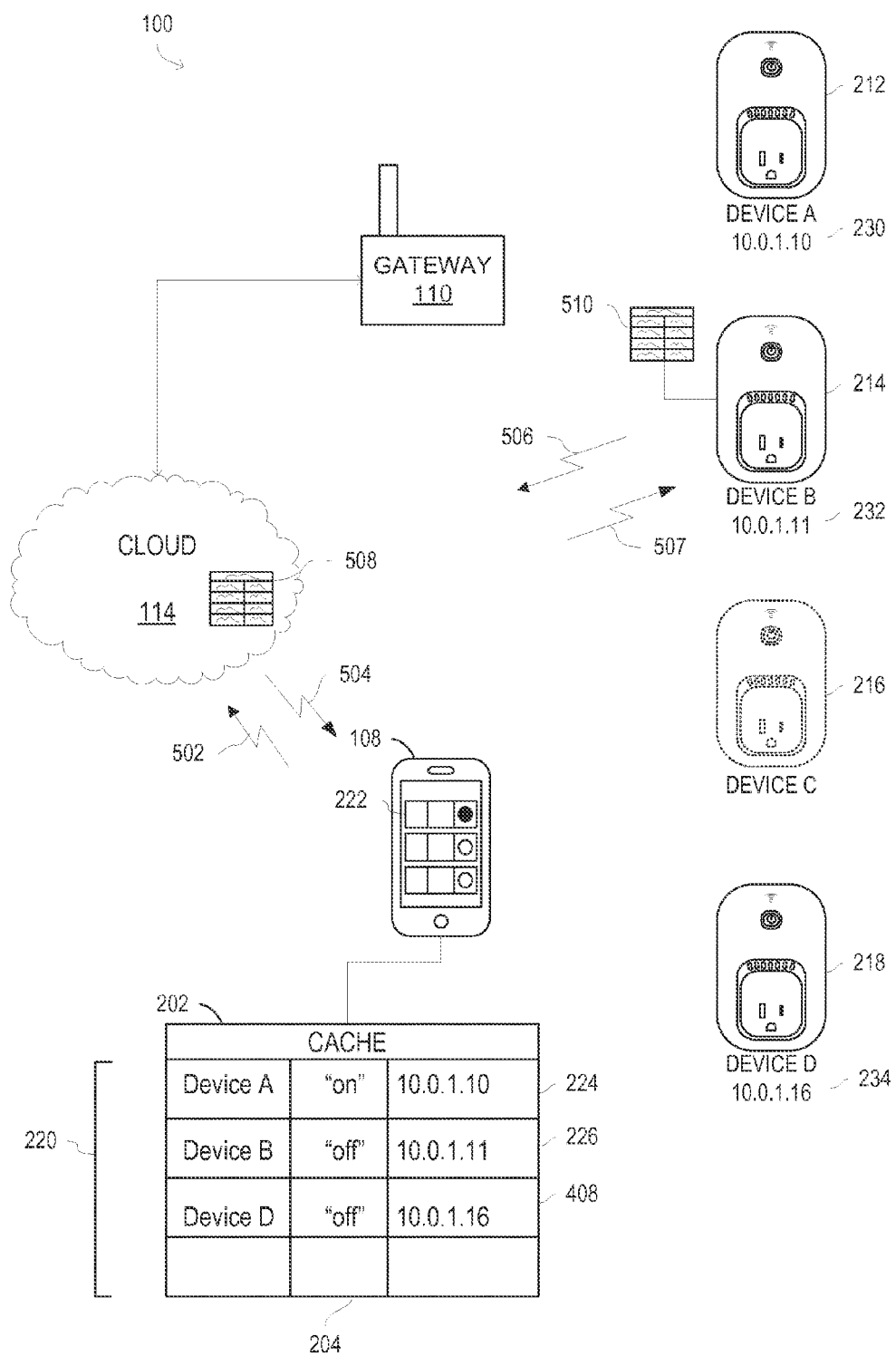
FIG. 5 is a schematic illustration of a local area network according to one embodiment.

FIG. 5 is a schematic illustration of a local area network 100 according to one embodiment. The mobile device 108 can connect to the cloud network 114 when the mobile device 108 is on the local area network 100. In some embodiments, the mobile device 108 can connect to the cloud network 114 when the mobile device is not on the local area network 100. The mobile device can upload cache update information 502 and download cache update information 504 to and from the cloud network 114. The cloud network 114 can include a cache 508 having some or all of the same information stored in cache 202. The mobile device 108 can upload the information in cache 202 to the cloud network 114, which can be used to update cache 508. Likewise, the mobile device 108 can download the information from cache 508, which can be used to update cache 202.

Referring to FIGS. 2-5, in some embodiments, a network device, such as Device B 214, can include its own cache 510. Device B 214 can perform the various functions described above with reference to the mobile device 108, such as transmitting status update requests and discovery requests and receiving status update replies and discovery replies. In some embodiments, Device B 214 can upload cache update information 506 from cache 510, which can be used to update cache 508. Device B 214 can download cache update information 507 from cache 508, which can be used to update cache 510.

In some embodiments, a device located on the local area network 100 can upload cache update information 506 from its cache 510 to the cloud network 114, which can be used to update cache 508, from which cache update information 504 can be downloaded by a mobile device 108 that is not on the local area network 100, which can be used to update its cache 202. Therefore, a mobile device 108 not on the local area network 100 can still obtain updated cache information from a network device, such as Device B 214, located on the local area network 100. Therefore, the next time the mobile device 108 connects to the local area network 100, it can quickly present a status display 222 based on status information that was obtained more recently than the last time the mobile device 108 was connected to the local area network 100.

In some embodiments, a reply, such as a Device B discovery reply 402b or a Device B status update reply 406b, can include cache update information from cache 510. The mobile device 108 can compare the cache update information from cache 510 with the information in cache 202 to determine which cache is most likely to be accurate, which can be a determination of which of cache 510 and cache 202 has been updated more recently. If the some or all of the information from cache 510 is more recent than that of cache 202, the mobile device 108 can update cache 202 with some or all of the cache update information from cache 510. The mobile device 108 can use updated cache 202 to cancel any status update requests that have been transmitted to last known addresses 224, 226, 228, 408 that are no longer accurate. The mobile device 108 can use updated cache 202 to transmit status update requests to any newly updated last known address 224, 226, 228, 408 to which a status update request has not been sent. The mobile device 108 can use updated cache 202 to update the status display 222.

Figure 6:
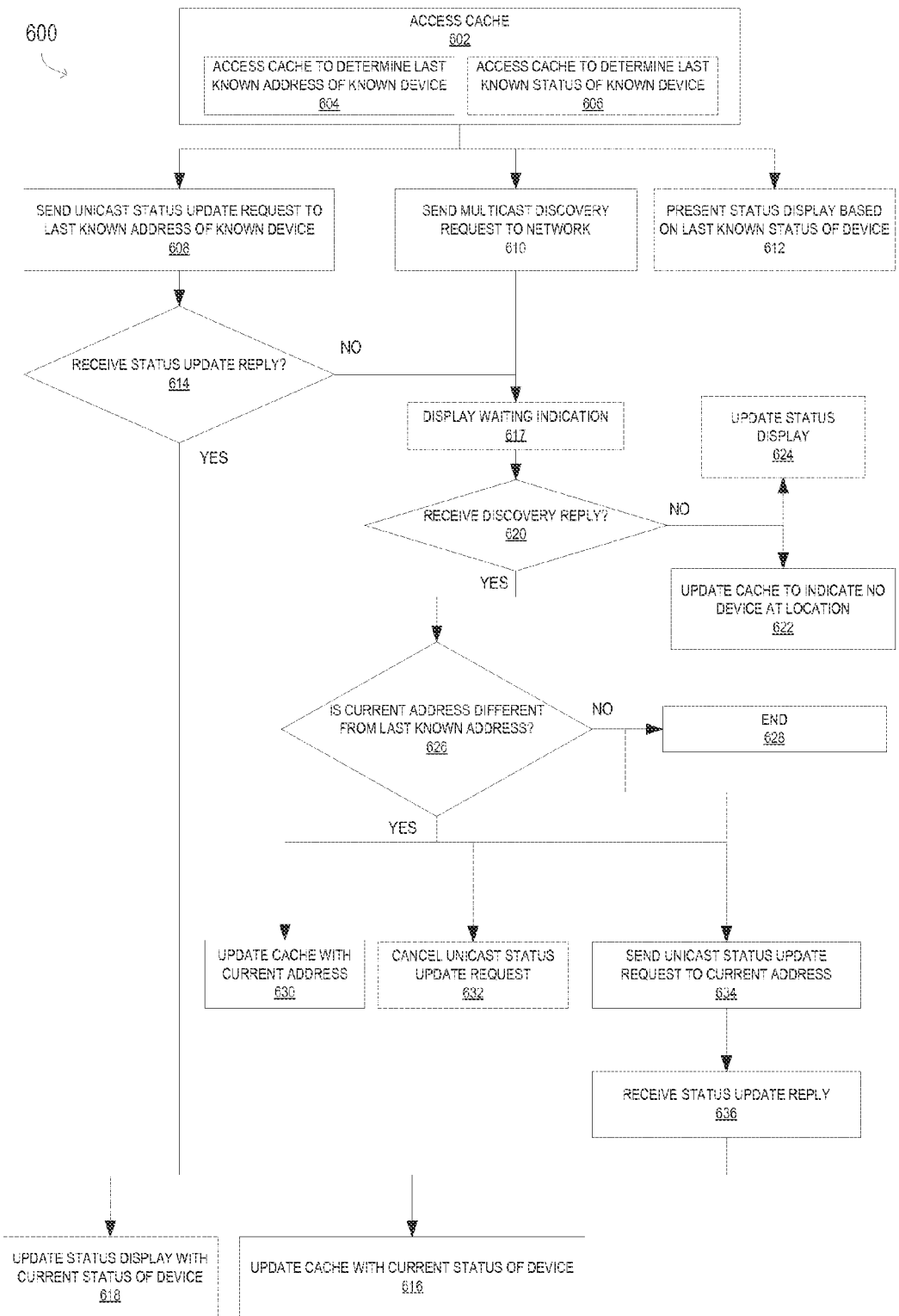
FIG. 6 is a flowchart of a smart rediscovery method according to one embodiment.

FIG. 6 is a flowchart of a smart rediscovery method 600 according to one embodiment. The smart rediscovery method 600 can be performed on any network device, such as mobile device 108, Device A 212, or gateway 110. The various actions described herein can be repeated as appropriate for each known device stored in a cache of the network device. At block 602, the cache of the network device is accessed, which can include accessing the cache to determine the last known address of a known device at block 604, and optionally accessing the cache to determine a last known status of the known device at block 606.

At block 608, a unicast status update request can be transmitted, addressed to the last known address of the known device. Immediately before, immediately afterwards, or otherwise concurrently with block 608, a multicast discovery request can be transmitted to the network at block 610. Immediately before, immediately afterwards, or otherwise concurrently with blocks 608 and 610, a status display can be presented based on the last known status of the device at block 612. In some embodiments, the network device can present the status display before transmitting the status update request of the discovery request in order to provide a user with a visual indication of the last known status of the device as soon as possible.

At block 614, the network device can wait a predetermined period of time for a status update reply in response to the status update request. The predetermined period of time can be any desired period of time, including under approximately five seconds, under approximately four seconds, under approximately three seconds, under approximately two seconds, and under approximately one seconds. If a status update reply is received, the cache can be updated with the current status of the device at block 616 and, optionally, the status display can be updated with the current status of the device at block 618.

If no status update reply is received at block 614 within the predetermined period of time, a waiting indication can be optionally displayed at block 617. The waiting indication can be a visual indicator presented on the display to globally indicate that the discovery process is ongoing or to individually indicate that the discovery process for a particular known device is ongoing.

In some embodiments, the waiting indication can be displayed at block 617 immediately after the discovery request is transmitted at block 610, without first waiting the predetermined period of time in block 614. In such a case, if a status update reply is received at block 614, any waiting indication that is displayed individually for the particular known device associated with the status update reply can be ceased.

At block 620, the network device can wait a predetermined period of time for a discovery reply associated with the known device in response to the discovery request. The network device can filter through numerous received discovery replies to determine if it has received a discovery reply associated with the known device, which can be determined by identifying information such as MAC address, a serial number, or other information. The predetermined period of time can be any desired period of time, including under approximately twenty seconds, under approximately fifteen seconds, and under approximately ten seconds. If no discovery reply associated with the known device is received after the predetermined period of time at block 620, the cache can be updated at block 622 to indicate that the known device is not accessible on the network, and optionally, the status display can be updated at block 624 to indicate that the known device is no longer accessible on the network.

If a discovery reply associated with the known device is received at block 620, the network device can determine whether the current address of the known device is different from the last known address of the known device at block 626. If the current address is not different from the last known address of the known device, the network device can stop performing additional functions at block 628, as a status update reply should have been received at block 614. In some embodiments, if the current address is not different from the last known address of the known device, the network device can continue at block 634, as described in further detail below.

At block 626, if the current address is different from the last known address of the known device, the cache can be updated with the current address at block 630 and a status update request can be transmitted to the current address at block 634. Additionally, if the current address is different from the last known address of the known device, the status update request from block 608 can be optionally cancelled at block 632.

After transmitting a status update request at block 634, the network device can receive a status update reply at block 636. The status update reply can contain status information that is used to update the cache of the network device with a current status of the known device at block 616, and optionally update the status display with a current status of the known device at block 618.

Additionally, in some embodiments, the network device can receive a reply from a not-previously known device (e.g., a new device) at block 620. In some embodiments, the network device can ignore certain new devices that are not associated with or controllable by the network device. For each new device that network device desires to communicate with (e.g., all home automation devices on the local area network), the network device can bypass block 626 and continue directly to block 630 to update the cache with information about the new device, and block 634 and its following blocks to determine a current status of the new device, as described above.

Figure 7:
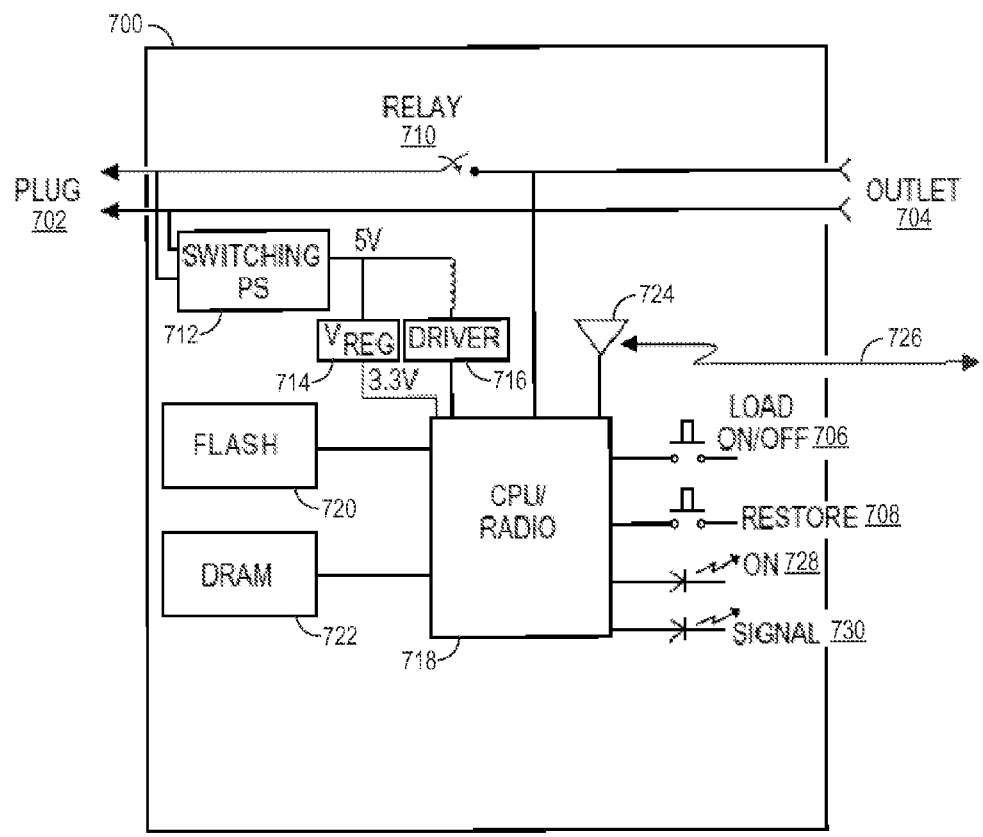
FIG. 7 is an example of a block diagram of the network device depicting different hardware and/or software components of the network device according to one embodiment.

FIG. 7 is an example of a block diagram of the network device 700 depicting different hardware and/or software components of the network device 700 according to one embodiment. The network device 700 can include an outlet 704, plug 702, power button 706, restore button 708, and communications signal indicator 730. The network device 700 can also include light source 728 associated with the power button 706. The light source 728 can be illuminated when the network device 700 is powered on.

The network device 700 can further include a relay 710. The relay 710 can be a switch that controls whether power is relayed from the plug 702 to the outlet 704. The relay 710 may be controlled either manually using the power button 706 or remotely using wireless communication signals. For example, when the power button 706 is in an ON position, the relay 710 may be closed so that power is relayed from the plug 702 to the outlet 704. When the power button 706 is in an OFF position, the relay 710 may be opened so that current is unable to flow from the plug 702 to the outlet 704. As another example, an application or program running on a mobile device may transmit a signal that causes the relay 710 to be opened or closed. For instance, a mobile application may display a graphical interface on the mobile device that includes a power button. The user may tap or otherwise select the power button, and the mobile application may transmit a communication signal (e.g., over a WiFi network) to the network device 700 instructing the network device 700 to open or close the relay 710.

The network device 700 further includes flash memory 720 and dynamic random access memory (DRAM) 722. The flash memory 720 may be used to store instructions or code relating to an operating system, one or more applications, and any firmware. The flash memory 720 can be used to store cache 510. The flash memory 720 may include non-volatile memory so that any firmware or other program can be can updated. In the event the network device 700 loses power, information stored in the flash memory 720 may be retained. The DRAM 722 may store various other types of information needed to run the network device 700, such as all runtime instructions or code.

The network device 700 further includes a CPU/Radio 718. The CPU/Radio 718 can control the operations of the network device 700. For example, the CPU/Radio 718 may execute various applications or programs stored in the flash memory 720 and/or the dynamic random access memory (DRAM) 722. The CPU/Radio 718 may also receive input from the various hardware and software components, interpret the input, and perform one or more functions in response to the input. As one example, the CPU/Radio 718 may determine whether the power button 706 has been pressed, and determines whether the relay 710 needs to be opened or closed. The CPU/Radio 718 may further perform all communications functions in order to allow the network device 700 to communicate with other network devices, one or more gateways, a cloud network, and/or one or more mobile devices. The network device 700 may communicate with other devices and/or networks via antenna 724. For example, antenna 724 may include a 2.4 GHz antenna that can transmit and receive WiFi communications signals. The antenna 724 may include other types of antennas that can communicate Bluetooth® signals, Zigbee® signals, Ultra-Wideband (UWB) signals, and/or the like. In some embodiments, the network device 700 may include multiple antennas for communicating different types of communication signals.

The network device 700 further includes a driver 716, a switching power supply 712, and a voltage regulator 714. The driver 716 may include instructions or code that can be used to translate control signals or commands received from applications running on the DRAM 722 to commands that the various hardware components in the network device 700 can understand. In some embodiments, the driver 716 may include an ambient application running on the DRAM 722. The switching power supply 712 may be used to transfer power from the outlet in which the plug 702 is connected to the various loads of the network device 700 (e.g., CPU/Radio 718). The switching power supply 712 may efficiently convert the voltage and current characteristics of the electrical power to a level that is appropriate for the components of the network device 700. For example, the switching power supply 712 may perform AC-DC conversion. In some embodiments, the switching power supply 712 may be used to control the power that is relayed from the plug 702 to the outlet 704. The voltage regulator 714 may be used to convert the voltage output from the switching power supply 712 to a lower voltage usable by the CPU/Radio 718. For example, the voltage regulator 714 may regulate the DC voltage from 5V to 3.3V.

In various embodiments, functions may be stored as one or more instructions or code in memory, such as the flash memory 720 and/or the DRAM 722. The network device 700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2-6, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2-6. The memory, such as the flash memory 720 and/or the DRAM 722, may be a processor-readable memory and/or a computer-readable memory that stores software code (programming code, instructions, etc.) configured to cause a processor(s) within the CPU/Radio 718 to perform the functions described. In other embodiments, one or more of the functions described may be performed in hardware.

A set of these instructions and/or code might be stored on a computer-readable storage medium, such as the flash memory 720 and/or the DRAM 722. In some cases, the storage medium might be incorporated within a computer system, such as the CPU/Radio 718. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 700 and/or might take the form of source and/or installable code, which, upon compilation and/or installation on the network device 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

It should be appreciated that the network device 700 may have other components than those depicted in FIG. 7. Further, the embodiment shown in the figures are only one example of a network device that may incorporate an embodiment of the invention. In some other embodiments, network device 700 may have more or fewer components than shown in the figure, may combine two or more components, or may have a different configuration or arrangement of components.

Figure 8:
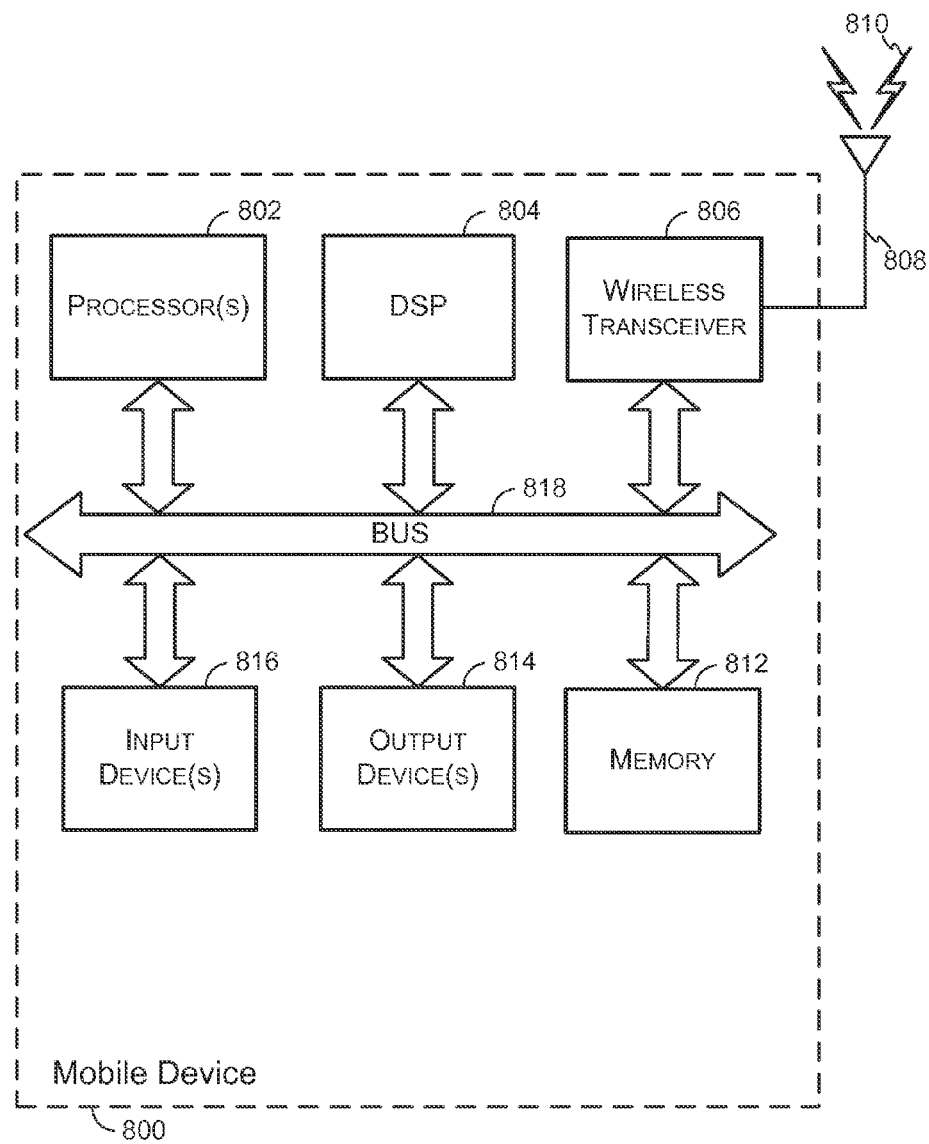
FIG. 8 illustrates an example of a mobile device according to one embodiment.

FIG. 8 illustrates an example of a mobile device 800 according to one embodiment. The mobile device 800 may be a cellular telephone, a smartphone, a laptop computer, a tablet, a personal digital assistant (PDA), a computing device, or any other mobile device having wireless connection capability. The mobile device 800 includes hardware elements that can be electrically coupled via a bus 818 (or may otherwise be in communication, as appropriate). In one embodiment, the bus 818 can be used for the processor(s) 802 to communicate between cores and/or with the memory 812. The hardware elements may include one or more processors 802, including without limitation one or more general-purpose processors and/or one or more special-purpose processors (such as digital signal processing chips, graphics acceleration processors, and/or the like); one or more input devices 816, which can include without limitation a camera, a mouse, a keyboard, a touch sensitive screen, a touch pad, a keypad, and/or the like; and one or more output devices 814, which can include, without limitation, a display, a printer, and/or the like.

The mobile device 800 may include one or more wireless transceivers 806 connected to the bus 818. The wireless transceiver 806 may be operable to receive a wireless signal 810 via antenna 808. The wireless signal 810 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 806 may be configured to receive various radio frequency (RF) signals 810 via antenna 808 from one or more gateways, network devices, cloud networks, and/or the like. Mobile device 800 may also be configured to decode and/or decrypt, via the DSP 804 and/or processor(s) 802, various signals received from one or more gateways, network devices, cloud networks, and/or the like.

The mobile device 800 may further include (and/or be in communication with) one or more non-transitory storage devices (e.g., memory 812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Memory 812 can be used to store cache 202.

In various embodiments, functions may be stored as one or more instructions or code in memory 812, such as on a computer-readable storage medium, such as RAM, ROM, FLASH, or disc drive, and executed by processor(s) 802 or DSP 804. The mobile device 800 can also comprise software elements (e.g., located within the memory 812), including, for example, an operating system, device drivers, executable libraries, and/or other code, such as one or more application programs, which may comprise computer programs implementing various functions Memory 812 may be a processor-readable memory and/or a computer-readable memory that stores software code (programming code, instructions, etc.) configured to cause the processor(s) 802 and/or DSP 804 to perform the various functions. In other embodiments, the various functions described may be performed in hardware.

Figure 9:
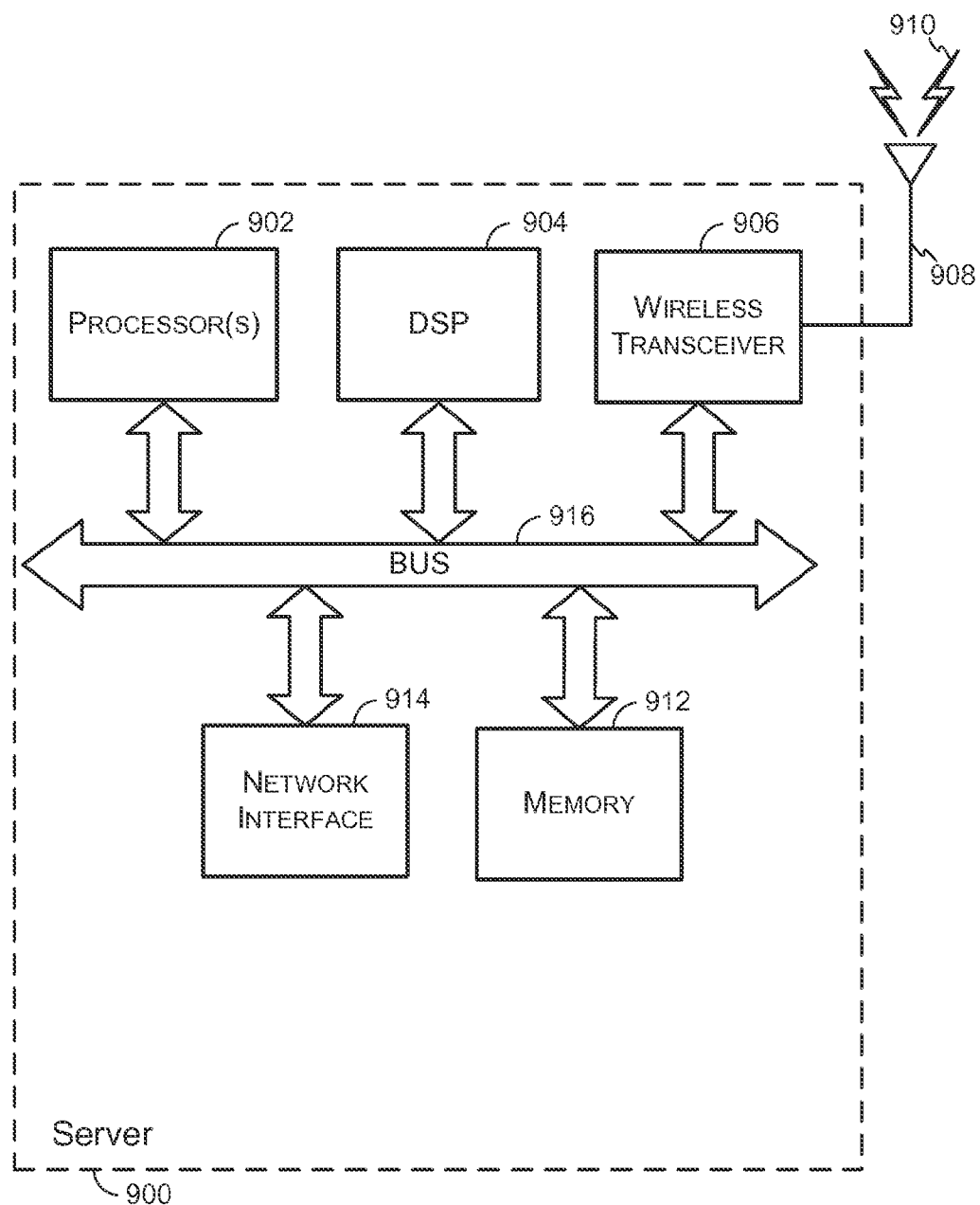
FIG. 9 illustrates an example of a server according to one embodiment.

FIG. 9 illustrates an example of a server 900 according to one embodiment. The server 900 includes hardware elements that can be electrically coupled via a bus 916 (or may otherwise be in communication, as appropriate). In one embodiment, the bus 916 can be used for the processor(s) 902 to communicate between cores and/or with the memory 912. The hardware elements may include one or more processors 902, including without limitation one or more general-purpose processors and/or one or more special-purpose processors (such as digital signal processing chips, graphics acceleration processors, and/or the like), memory 912, DSP 904, a wireless transceiver 906, a bus 916, and antenna 908. Furthermore, in addition to the wireless transceiver 906, server 900 can further include a network interface 914 to communicate with a network (e.g., a local area network, a network of a preferred carrier, Internet, etc.).

The server 900 may further include (and/or be in communication with) one or more non-transitory storage devices (e.g., memory 912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Memory 912 can be used to store cache 508.

In various embodiments, functions may be stored as one or more instructions or code in memory 912. The server 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 5, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 5. The memory 912 may be a processor-readable memory and/or a computer-readable memory that stores software code (programming code, instructions, etc.) configured to cause the processor(s) 902 to perform the functions described. In other embodiments, one or more of the functions described may be performed in hardware.

A set of these instructions and/or code might be stored on a computer-readable storage medium, such as the memory 912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the server 900 and/or might take the form of source and/or installable code, which, upon compilation and/or installation on the server 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   accessing a cache on a computing device, wherein accessing includes determining a last known address associated with a first device on a network;
   requesting a status update during a predetermined time period, wherein requesting the status update includes addressing a status update request to the last known address associated with the first device on the network, and wherein the status update request includes an inquiry for current status information associated with the first device on the network;
   transmitting a discovery request during the predetermined time period, wherein the discovery request is transmitted to the network, and wherein when the discovery request is received by a second device on the network, the second device responds to the discovery request with a current address of the first device on the network;
   waiting for a reply for the predetermined period of time; and
   updating the cache.

2. The method of claim 1, wherein updating the cache includes:
   updating the cache to remove the last known address of the first device when the reply is not received within the predetermined period of time; or
   updating the cache with a current address of the first device when the reply is received, wherein the reply includes the current address of the device.

3. The method of claim 1, further comprising:
accessing the cache to determine a last known status of the first device;
presenting a display corresponding to the last known status of the first device;
receiving current status information of the first device; and
updating the display using the current status information of the first device, wherein updating the cache includes updating the cache using the current status information of the first device.

4. The method of claim 3, further comprising:
transmitting a command to change a status of the first device.

5. The method of claim 1, wherein the discovery request is a multicast discovery request.

6. The method of claim 1, further comprising:
presenting a display after the predetermined period of time, wherein the display is presented when a response to the status update is not received within the predetermined period of time.

7. The method of claim 1, further comprising:
cancelling the status update request when the reply is received.

8. The method of claim 1, further comprising:
receiving the reply;
transmitting cache update information, wherein the cache update information includes the reply.

9. The method of claim 1, wherein transmitting requesting the status update and transmitting the discovery request occur concurrently.

10. A system, comprising:
one or more data processors; and
a non-transitory computer-readable storage medium containing instructions which when executed on the one or more data processors, cause the one or more processors to perform operations including:
accessing a cache on a computing device, wherein accessing includes determining a last known address associated with a first device on a network;
requesting a status update during a predetermined time period, wherein requesting the status update includes addressing a status update request to the last known address associated with the first device on the network, and wherein the status update request includes an inquiry for current status information associated with the first device on the network;
transmitting a discovery request during the predetermined time period, wherein the discovery request is transmitted to the network, and wherein when the discovery request is received by a second device on the network, the second device responds to the discovery request with a current address of the first device on the network;
waiting for a reply for the predetermined period of time; and
updating the cache.

11. The system of claim 10, wherein updating the cache includes:
updating the cache to remove the last known address of the first device when the reply is not received within the predetermined period of time; or
updating the cache with a current address of the first device when the reply is received, wherein the reply includes the current address of the device.

12. The system of claim 10, further comprising instructions which when executed on the one or more data processors, cause the one or more processors to perform operations including:
accessing the cache to determine a last known status of the first device;
presenting a display corresponding to the last known status of the first device;
receiving current status information of the first device; and
updating the display using the current status information of the first device, wherein updating the cache includes updating the cache using the current status information of the first device.

13. The system of claim 12, further comprising instructions which when executed on the one or more data processors, cause the one or more processors to perform operations including:
transmitting a command to change a status of the first device.

14. The system of claim 10, wherein the discovery request is a multicast discovery request.

15. The system of claim 10, further comprising instructions which when executed on the one or more data processors, cause the one or more processors to perform operations including:
presenting a display after the predetermined period of time, wherein the display is presented when a response to the status update request is not received within the predetermined period of time.

16. The system of claim 10, further comprising instructions which when executed on the one or more data processors, cause the one or more processors to perform operations including:
cancelling the status update request when the reply is received.

17. The system of claim 10, further comprising instructions which when executed on the one or more data processors, cause the one or more processors to perform operations including:
receiving the reply;
transmitting cache update information, wherein the cache update information includes the reply.

18. The system of claim 1, wherein requesting the status update and transmitting the discovery request occur concurrently.

19. A computer-program product tangibly embodied in a non-transitory machine-readable storage medium, including instructions configured to cause a data processing apparatus to perform operations including:
accessing a cache on a computing device, wherein accessing the cache includes determining a last known address associated with a first device on a network;
requesting a status update during a predetermined time period, wherein requesting the status update includes addressing a status update request to the last known address associated with the first device on the network, and wherein the status update request includes an inquiry for current status information associated with the first device on the network;
transmitting a discovery request during the predetermined time period, wherein the discovery request is transmitted to the network, and wherein when the discovery request is received by a second device on the network, the second device responds to the discovery request with a current address of the first device on the network;

waiting for a reply for the predetermined period of time; and updating the cache.

20. The computer-program product of claim 19, wherein updating the cache includes:
   updating the cache to remove the last known address of the first device when the reply is not received within the predetermined period of time; or
   updating the cache with a current address of the first device when the reply is received, wherein the reply includes the current address of the device.

21. The computer-program product of claim 19, wherein the operations further include:
   accessing the cache to determine a last known status of the first device;
   presenting a display corresponding to the last known status of the first device;
   receiving current status information of the first device; and
   updating the display using the current status information of the first device, wherein updating the cache includes updating the cache using the current status information of the first device.

22. The computer-program product of claim 21, wherein the operations further include:
   transmitting a command to change a status of the first device.

23. The computer-program product of claim 19, wherein the discovery request is a multicast discovery request.

24. The computer-program product of claim 19, wherein the operations further include:
   presenting a display after the predetermined period of time, wherein the display is presented when a response to the status update request is not received within the predetermined period of time.

25. The computer-program product of claim 19, wherein the operations further include:
   cancelling the status update request when the reply is received.

26. The computer-program product of claim 19, wherein the operations further include:
   receiving the reply;
   transmitting cache update information, wherein the cache update information includes the reply.

27. The computer-program product of claim 19, wherein requesting the status update and transmitting the discovery request occur concurrently.

* * * * *